(12) United States Patent
Marocchini et al.

(10) Patent No.: US 8,439,073 B2
(45) Date of Patent: May 14, 2013

(54) GATE VALVE

(75) Inventors: Francis P. Marocchini, Somers, CT (US); Codrin D. Sandu, Bayside, NY (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 116 days.

(21) Appl. No.: 12/879,659

(22) Filed: Sep. 10, 2010

(65) Prior Publication Data
US 2012/0061601 A1  Mar. 15, 2012

(51) Int. Cl.
*F16K 11/078* (2006.01)

(52) U.S. Cl.
USPC .................. 137/625.4; 137/625.45; 137/875; 251/301

(58) Field of Classification Search ............... 137/625.4, 137/625.44, 625.45, 875; 251/301, 256, 251/266, 298–300
See application file for complete search history.

(56) References Cited

U.S. PATENT DOCUMENTS

| | | | | |
|---|---|---|---|---|
| 346,821 A * | 8/1886 | Mock | ............................ | 137/555 |
| 675,963 A * | 6/1901 | Mills | ............................ | 137/875 |
| 791,666 A * | 6/1905 | Wishart | ........................ | 138/37 |
| 819,823 A * | 5/1906 | Trigg | ............................. | 137/875 |
| 820,740 A * | 5/1906 | Schmidt | .................... | 137/625.44 |
| 913,400 A * | 2/1909 | Kimball | .................... | 137/625.44 |
| 1,065,391 A * | 6/1913 | Piel | ............................. | 137/625.44 |
| 1,065,467 A * | 6/1913 | Piel | ............................. | 137/625.44 |
| 1,472,514 A * | 10/1923 | Cryan | ........................ | 137/625.44 |
| 1,496,915 A * | 6/1924 | Weir et al. | ................ | 137/625.44 |
| 1,637,761 A * | 8/1927 | Butler | ............................. | 251/75 |
| 1,813,273 A * | 7/1931 | Bovey | ........................ | 29/890.122 |
| 2,549,012 A * | 4/1951 | Robinson | ...................... | 137/114 |
| 3,006,367 A * | 10/1961 | Thompson et al. | ........... | 137/875 |
| 3,119,594 A | 1/1964 | Heggem | | |
| 3,228,653 A * | 1/1966 | Trimmer | ....................... | 251/306 |
| 3,365,165 A * | 1/1968 | Gire | ............................. | 251/118 |
| 3,373,771 A * | 3/1968 | Boyen | ........................ | 137/625.46 |
| 3,384,421 A * | 5/1968 | Flatt | ............................. | 406/183 |
| 3,472,317 A * | 10/1969 | Fowler | .......................... | 166/335 |
| 3,659,970 A * | 5/1972 | McElroy | ....................... | 417/516 |
| 3,773,062 A * | 11/1973 | McIver | ............................. | 137/1 |
| 3,866,628 A * | 2/1975 | Weber et al. | ............. | 137/625.44 |

(Continued)

FOREIGN PATENT DOCUMENTS

DE  102007015733 A1  11/2007
EP       1939119 A1   7/2008

OTHER PUBLICATIONS

European Search Report; Application No. 11180837.4; Date of mailing: Dec. 12, 2012; 6 pages.

(Continued)

*Primary Examiner* — John K Fristoe, Jr.
*Assistant Examiner* — Marina Tietjen
(74) *Attorney, Agent, or Firm* — Cantor Colburn LLP

(57) ABSTRACT

A high temperature gate valve including a valve body formed to define first and second ports and an exit, each of which has a length-wise dimension greater than a height-wise dimension, and a door, having a length-wise dimension greater than a height-wise dimension, coupled to the valve body to occupy and move between positions at which the door prevents fluid communication between one of the first or the second port and the exit and intermediate positions at which fluid communication between the first and the second port and the exit is permitted.

16 Claims, 2 Drawing Sheets

U.S. PATENT DOCUMENTS

| | | | | |
|---|---|---|---|---|
| 3,881,516 A | * | 5/1975 | Childers et al. | 137/625.44 |
| 4,081,175 A | | 3/1978 | Hasbrouck | |
| 4,122,612 A | * | 10/1978 | Mrofchak | 34/86 |
| 4,252,149 A | * | 2/1981 | Dollison | 137/625.44 |
| 4,312,378 A | * | 1/1982 | Dollison | 137/625.44 |
| 4,351,361 A | * | 9/1982 | Worley | 137/625.44 |
| 4,359,932 A | * | 11/1982 | Childers | 92/31 |
| 4,383,546 A | | 5/1983 | Walters, Jr. | |
| 4,489,780 A | * | 12/1984 | Duhon | 166/70 |
| 4,718,457 A | | 1/1988 | Luger | |
| 4,944,488 A | | 7/1990 | Clayson | |
| 5,211,195 A | | 5/1993 | Hamos | |
| 5,265,547 A | | 11/1993 | Daws | |
| 5,329,970 A | | 7/1994 | Squirrell | |
| 5,690,135 A | | 11/1997 | Dehais | |
| 5,915,405 A | | 6/1999 | Soszka | |
| 5,983,621 A | | 11/1999 | Stambaugh, Sr. et al. | |
| 6,182,699 B1 | * | 2/2001 | Hawkes | 137/875 |
| 6,499,508 B2 | * | 12/2002 | Sato et al. | 137/625.45 |
| 6,644,352 B1 | | 11/2003 | Pfetzer | |
| 6,648,018 B2 | | 11/2003 | Gagnon | |
| 6,793,194 B1 | | 9/2004 | Grinberg | |
| 7,086,416 B2 | * | 8/2006 | Kurian et al. | 137/625.44 |
| 7,290,566 B1 | * | 11/2007 | Young et al. | 137/875 |
| 7,534,074 B2 | | 5/2009 | Kato | |
| 7,584,782 B1 | | 9/2009 | Bizzarro | |
| 7,600,380 B2 | | 10/2009 | Grissom et al. | |
| 2001/0047834 A1 | * | 12/2001 | Menin et al. | 137/875 |
| 2006/0096648 A1 | * | 5/2006 | Guerrier | 137/875 |
| 2009/0166573 A1 | | 7/2009 | Sakai et al. | |

OTHER PUBLICATIONS

Canadian Office Action dated Jul. 12, 2012 for corresponding Application No. 2,750,945; 4 pages.

* cited by examiner

GATE VALVE

BACKGROUND OF THE INVENTION

The subject matter disclosed herein relates to a gate valve and, more particularly, a high temperature gate valve.

The selection of high temperature air valves is limited at best and has conventionally been addressed using butterfly valves. These valves are typically round and fundamentally consist of a rotating disk, which opens and closes to allow or prevent air passage. Due to the nature of butterfly valves, they are known to be efficient where spatial and weight constraints are not a major concern problem and where tolerances, for relatively large valve diameters, are large. However, with the ever increasing need for more efficient packaging and higher temperature devices, the search for more versatile air management components has become clear.

BRIEF DESCRIPTION OF THE INVENTION

According to an aspect of the invention, a high temperature gate valve is provided and includes a valve body formed to define first and second ports and an exit, each of which has a length-wise dimension greater than a height-wise dimension, and a door, having a length-wise dimension greater than a height-wise dimension, coupled to the valve body to occupy and move between positions at which the door prevents fluid communication between one of the first or the second port and the exit and intermediate positions at which fluid communication between the first and the second port and the exit is permitted.

According to another aspect of the invention, a high temperature gate valve is provided and includes a valve body, having thickness and length-wise dimensions greater than a height dimension, which is formed to define at least first and second flow paths each having a common exit, a door, having dimensions complementary to those of the valve body, to occupy and move between positions at which the door blocks one of the first or the second flow paths and intermediate positions at which fluid communication along the first and the second flow paths is permitted and an actuator operably coupled to the door to control the movement of the door.

According to yet another aspect of the invention, a high temperature gate valve is provided and includes a valve body formed to define first and second ports and an exit, each of which has a length-wise dimension greater than a height-wise dimension and a door, having a length-wise dimension greater than a height-wise dimension, coupled to the valve body to occupy and move between positions at which the door prevents fluid communication between one of the first or the second port and the exit and intermediate positions at which fluid communication between the first and the second port and the exit is permitted, wherein the first port, the second port, the exit and the door are each tapered and include rounded distal ends.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, a high temperature gate valve is provided and may be flattened in a sandwich-like package. In addition, the door-style valve provides for a relatively large air passageway relative to a butterfly valve. The high temperature gate valve is designed to maintain a low radial profile while having the ability to direct gases and/or fluids, such as aircraft engine fuel, where needed. It has simple configuration with relatively few parts with operation accomplished via rotation of the door between two sealing surfaces such that at least two ports are always connected while one port may be isolated. The three piece body is manufactured and assembled in a strategic manner to optimize the metal-to-metal sealing interfaces. The valve can be controlled to provide modulation of two sources into one by controlling the rotation of a shaft to which the door is fastened. The valve may use traditional bearing technology to provide robust/reliable rotation of the shaft.

Figure 1:
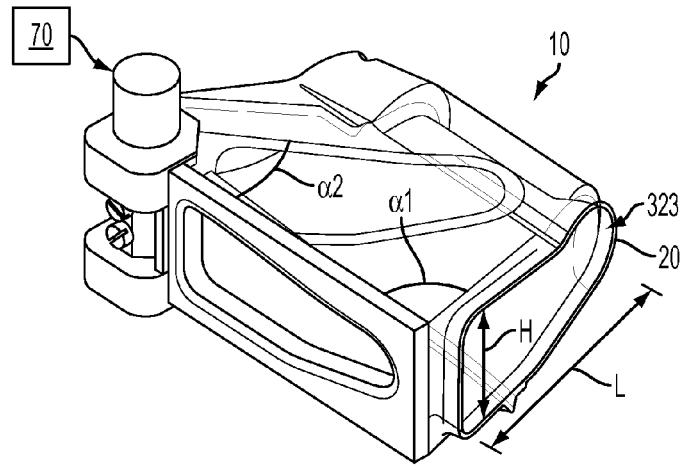
FIG. 1 is a perspective view of a high temperature gate valve.
Figure 2:
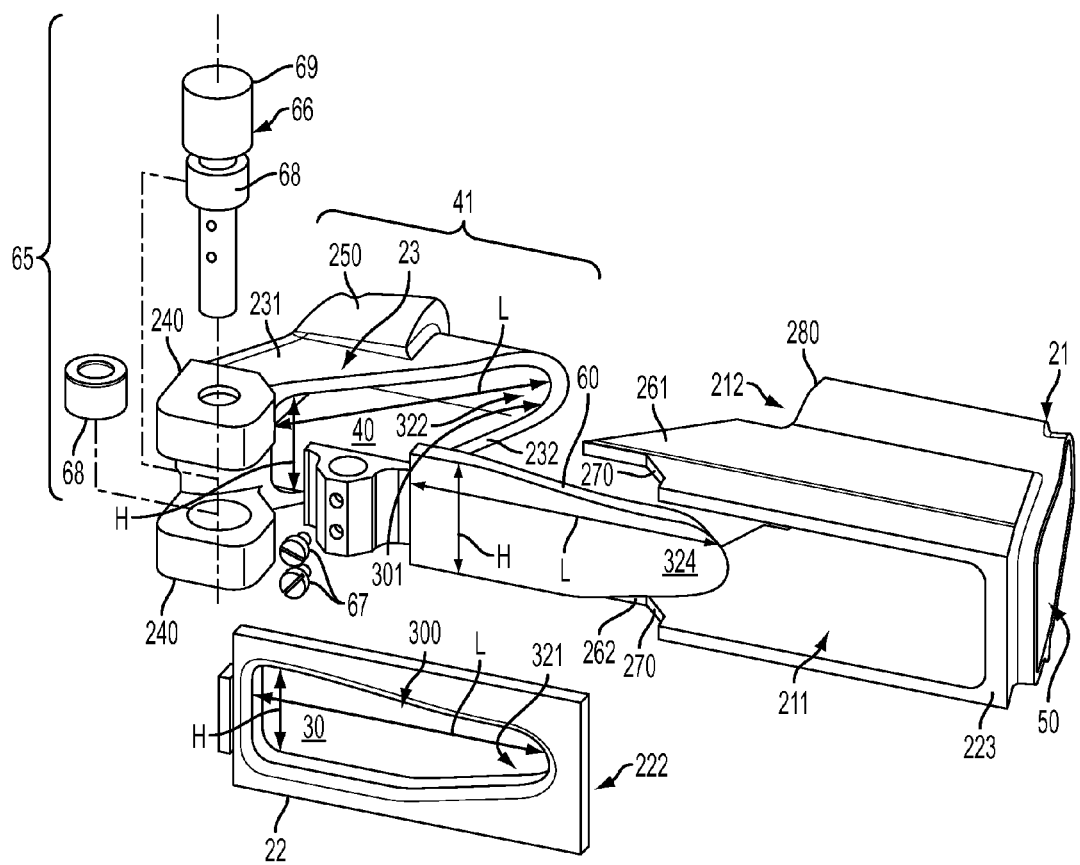
FIG. 2 is an exploded perspective view of a high temperature gate valve.

With reference to FIGS. 1 and 2, a high temperature gate valve 10 is provided and includes a valve body 20, a door 60 and an actuator 70. The valve body 20 is formed to define a first port 30, a second port 40 and an exit 50, each of which has a length-wise dimension, L, which is greater than a height-wise dimension, H. The door 60 also has a length-wise dimension, L, which is greater than a height-wise dimension, H. The door 60 is coupled to the valve body 20 to occupy and move between blocking positions and intermediate positions. In the blocking positions, the door 60 prevents fluid communication between one of the first port 30 or the second port 40 and the exit 50. In the intermediate positions, the door 60 permits fluid communication between the first port 30 and the second port 40 and the exit 50. The actuator 70 may be any servo controller and is operably coupled to the door 60 to control the movement of the door 60 between the positions and the intermediate positions.

The valve body 20 may include a first body portion 21, a closure 22 and a second body portion 23. The first body portion 21 is formed to define a first opening 211, a second opening 212 and the exit 50. The closure 22 may be sealed to the first body portion 21 at the first opening 211 and is formed to define the first port 30 at the first opening 211. The second body portion 23 may be sealed to the first body portion 21 at the second opening 212 and is formed to define the second port 40 at or proximate to the second opening 212. A first angle, $\alpha_1$, which is formed between the lengthwise dimensions of the first port 30 and the exit 50 is greater than a second angle, $\alpha_2$, which is formed between the first port 30 and the second port 40. While the first port 30 may be short and defined closely to the first opening 211, the second port 40 may be defined through a relatively long conduit 41 leading to the second opening 212.

The closure 22 and the first body portion 21 each comprises complementary mating surfaces 222 and 223, respectively, which may be at least one of welded and brazed together. The second body portion 23 includes upper and lower walls 231, 232, bosses 240 protruding from the upper and lower walls 231, 232 and a first shoulder 250, which may be rounded. Similarly, the first body portion 21 includes upper and lower flaps 261, 262 to sealably abut opposite faces of the upper and lower walls 231, 232, respectively, mating surfaces 270 to abut the bosses 240 and a second shoulder 280, which may be rounded, to abut the first shoulder 250. The second body portion 23 may be at least one of welded and brazed to the first body portion 21 at least at interfaces between the mating surfaces 270 and the bosses 240 and between the first and second shoulders 250 and 280.

The closure 22 includes a first seal surface 300 and the second body portion 23 includes a second seal surface 301. The door 60 abuts the first seal surface 300 to prevent fluid communication between the first port 30 and the exit 50. Similarly, the door 60 abuts the second seal surface 301 to prevent fluid communication between the second port 40 and the exit 50. An inner edge of the first seal surface 300 and an inner edge of the second seal surface 301 are each shaped in a similar fashion as the door 60 but with smaller dimensions to provide for formation of reliable seals.

In accordance with embodiments, the first port 30, the second port 40 and the exit 50 may each be tapered along their respective longitudinal lengths. Moreover, the first port 30, the second port 40 and the exit 50 may each be rounded at distal ends 321, 322, 323 thereof. In a similar fashion, the door 60 may be tapered along the length-wise dimension, L, and may be rounded at a distal end 324 thereof.

The door 60 may be pivotable about a hinge assembly 65 that is integrally formed with or otherwise coupled to the valve body 20. The hinge assembly 65 includes a shaft 66, about which the door 60 pivots, retaining pins 67 to fasten the door 60 to the shaft 66 and bushings 68 for support of the door 60 at the shaft 66. The actuator 70 may be operably coupled to a head 69 of the shaft 66.

As shown in FIG. 2, the high temperature gate valve 10 may be assembled as follows. The door 60 and the second body portion 23 are machined as a matched set by controlling the dimensional tolerance of the sealing surfaces to the pivots. Tight control of these characteristics optimizes the sealing interface. The closure 22 is welded or brazed to the first body portion 21. With the door 60 installed on the second body portion 23, the cover 22 and first body portion 21 are slid onto the assembly. The door 60 is than held against the cover 22 and the first body portion 21 is welded or brazed to the second body portion 23. Assembly in this manor optimizes both sealing interfaces.

The second body portion 23 may be welded and/or brazed to the first body portion 21. The door 60 may be positioned with an end disposed at the hinge assembly 65. The shaft 66 is then inserted through the end of the door 60 and the bushings 68 and the retaining pins 67 fasten the door 60 to the shaft 66. At this point, the closure 22 may be welded and/or brazed to the first body portion 21.

Figure 3:
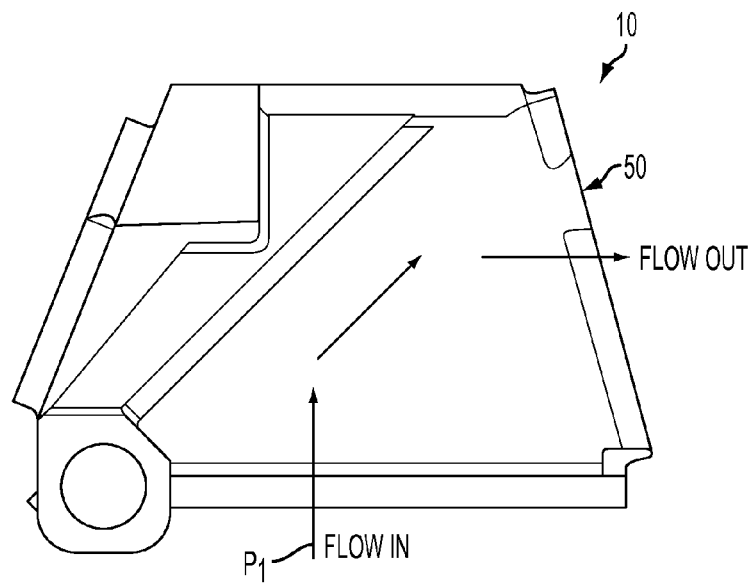
FIG. 3 is an illustrative view of a first flow path.
Figure 4:
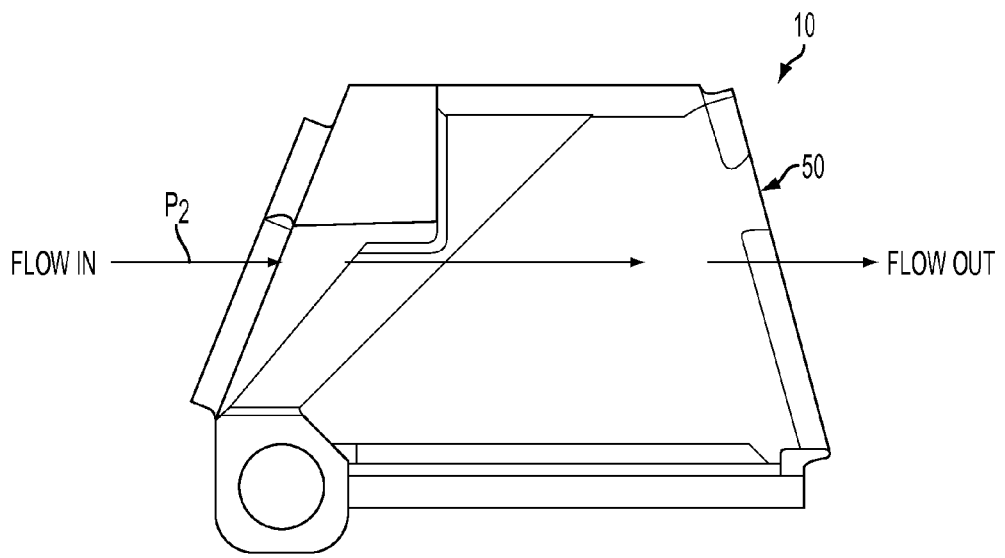
FIG. 4 is an illustrative view of a second flow path.

Thus, as described above and with reference to FIGS. 3 and 4, the valve body 20 may have a substantially trapezoidal shape with thickness and length-wise dimensions that are each greater than a height dimension thereof and may be formed to define at least a first flow path $P_1$ leading to exit 50 and a second flow path $P_2$ leading to exit 50. The door 60, having dimensions complementary to those of the valve body 20, occupies and moves between positions at which the door 60 blocks one of the first or the second flow paths $P_1$, $P_2$ and intermediate positions at which fluid communication along the first and the second flow paths $P_1$, $P_2$ is permitted.

The high temperature gate valve 10 described herein may be used to direct high temperature air to and from a fuel air heat exchanger in an aircraft. The targeted efficiency of this system may indicate that the high temperature gate valve 10 be integrally formed with the fuel/air heat exchanger, which needs to be within the engine case. The shape of the various components described above allows for such integration.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A high temperature gate valve, comprising:
a valve body formed to define first and second ports and an exit, each of which has a length-wise dimension greater than a height-wise dimension at respective distal ends of the first and second ports and the exit; and
a door, having a length-wise dimension greater than a height-wise dimension, coupled to the valve body to occupy and move around a hinge assembly between positions at which the door prevents fluid communication between one of a proximal section of the first port or a proximal section of the second port and a proximal section of the exit and intermediate positions at which fluid communication between the first and the second ports and the exit is permitted,
the respective proximal sections and the respective distal ends of the first port, the second port and the exit being defined at opposite ends of each, and
the length-wise dimensions of the valve body and the door being directed radially away from the hinge assembly and the height-wise dimensions of the valve body and the door being directed along a longitudinal axial of the hinge assembly,
wherein the valve body comprises:
a first body portion formed to define first and second openings and the exit;
a closure, which is sealed to the first body portion at the first opening and formed to define the first port at the first opening; and
a second body portion, which is sealed to the first body portion at the second opening and formed to define the second port at the second opening,
wherein an angle formed between the lengthwise dimensions of the first port and the exit is greater than an angle formed between the first and second ports.

2. The high temperature gate valve according to claim 1, wherein the closure and the first body portion each comprises complementary mating surfaces.

3. The high temperature gate valve according to claim 2, wherein the complementary mating surfaces are at least one of welded and brazed.

4. The high temperature gate valve according to claim 1, wherein the closure and the second body portion each comprises a seal surface against which the door abuts to prevent fluid communication between the first port and the second port and the exit, respectively, an inner edge of each of the seal surfaces and the door being similarly shaped.

5. The high temperature gate valve according to claim 1, wherein the first port, the second port and the exit are tapered.

6. The high temperature gate valve according to claim 1, wherein the first port, the second port and the exit are rounded at distal ends thereof.

7. The high temperature gate valve according to claim 1, wherein the door is tapered along the length-wise dimension.

8. The high temperature gate valve according to claim 1, wherein the door is rounded at a distal end thereof.

9. The high temperature gate valve according to claim 1, wherein the hinge assembly is integrally formed with the valve body.

10. The high temperature gate valve according to claim 9, wherein the hinge assembly comprises a shaft about which the door pivots and retaining pins to fasten the door to the shaft.

11. The high temperature gate valve according to claim 10, wherein a head of the shaft is operably coupled to an actuator to control movement of the door.

12. A high temperature gate valve, comprising:
a valve body formed to define first and second ports and an exit, each of which has a length-wise dimension greater than a height-wise dimension at respective distal ends of the first and second ports and the exit; and
a door having a length-wise dimension greater than a height-wise dimension coupled to the valve body to occupy and move around a hinge assembly between positions at which the door prevents fluid communication between one of a proximal section of the first port or a proximal section of the second port and a proximal section of the exit and intermediate positions at which fluid communication between the first and the second ports and the exit is permitted,
the respective proximal sections and the respective distal ends of the first port, the second port and the exit being defined at opposite ends of each, and
the length-wise dimensions of the valve body and the door being directed radially away from the hinge assembly and the height-wise dimensions of the valve body and the door being directed along a longitudinal axial of the hinge assembly,
wherein the valve body comprises:
a first body portion formed to define first and second openings and the exit;
a closure, which is sealed to the first body portion at the first opening and formed to define the first port at the first opening; and
a second body portion, which is sealed to the first body portion at the second opening and formed to define the second port at the second opening,
wherein the second body portion comprises upper and lower walls, bosses protruding from the upper and lower walls and a first shoulder, and
the first body portion comprises upper and lower flaps to sealably abut opposite faces of the upper and lower walls, respectively, mating surfaces to abut the bosses and a second shoulder to abut the first shoulder.

13. The high temperature gate valve according to claim 12, wherein the second body portion is at least one of welded and brazed to the first body portion at least at interfaces between the mating surfaces and the bosses and between the first and second shoulders.

14. A high temperature gate valve, comprising:
a valve body, having thickness and length-wise dimensions greater than a height dimension at distal ends of first and second ports and an exit, the valve body being formed to define at least first and second flow paths extending from the distal ends of the first and second ports, respectively, each of which has a common exit at the distal end of the exit;
a door, having dimensions complementary to those of the valve body, to occupy and move around a hinge assembly between positions at which the door blocks one of the first or the second flow paths at respective proximal sections of the first and second ports and the exit and intermediate positions at which fluid communication along the first and the second flow paths is permitted; and
an actuator operably coupled to the door to control the movement of the door,
the respective proximal sections and the respective distal ends of the first port, the second port and the exit being defined at opposite ends of each, and
the length-wise dimensions of the valve body and the door being directed radially away from the hinge assembly and the height dimensions of the valve body and the door being directed along a longitudinal axial of the hinge assembly,
wherein the valve body has a substantially trapezoidal shape.

15. The high temperature gate valve according to claim 14, wherein the first flow path is curved and the second flow path is substantially straight.

16. The high temperature gate valve according to claim 14, wherein the door pivots about and is fastened to a shaft of the hinge assembly integrally formed with the valve body.

* * * * *